Aug. 25, 1942.                F. W. BRAENDEL                     2,293,930
                                  SCREW
                            Filed June 17, 1939            2 Sheets-Sheet 1
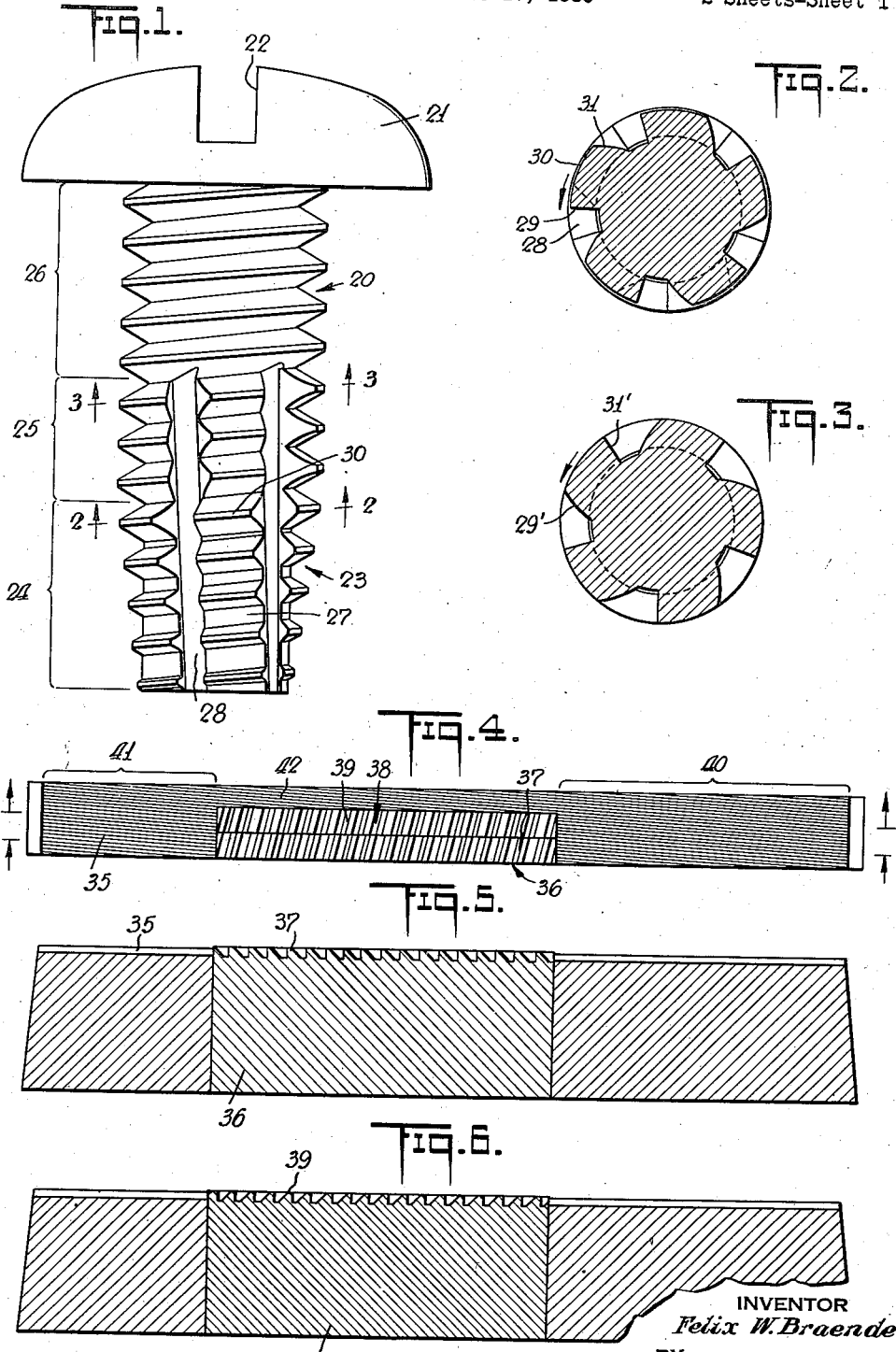

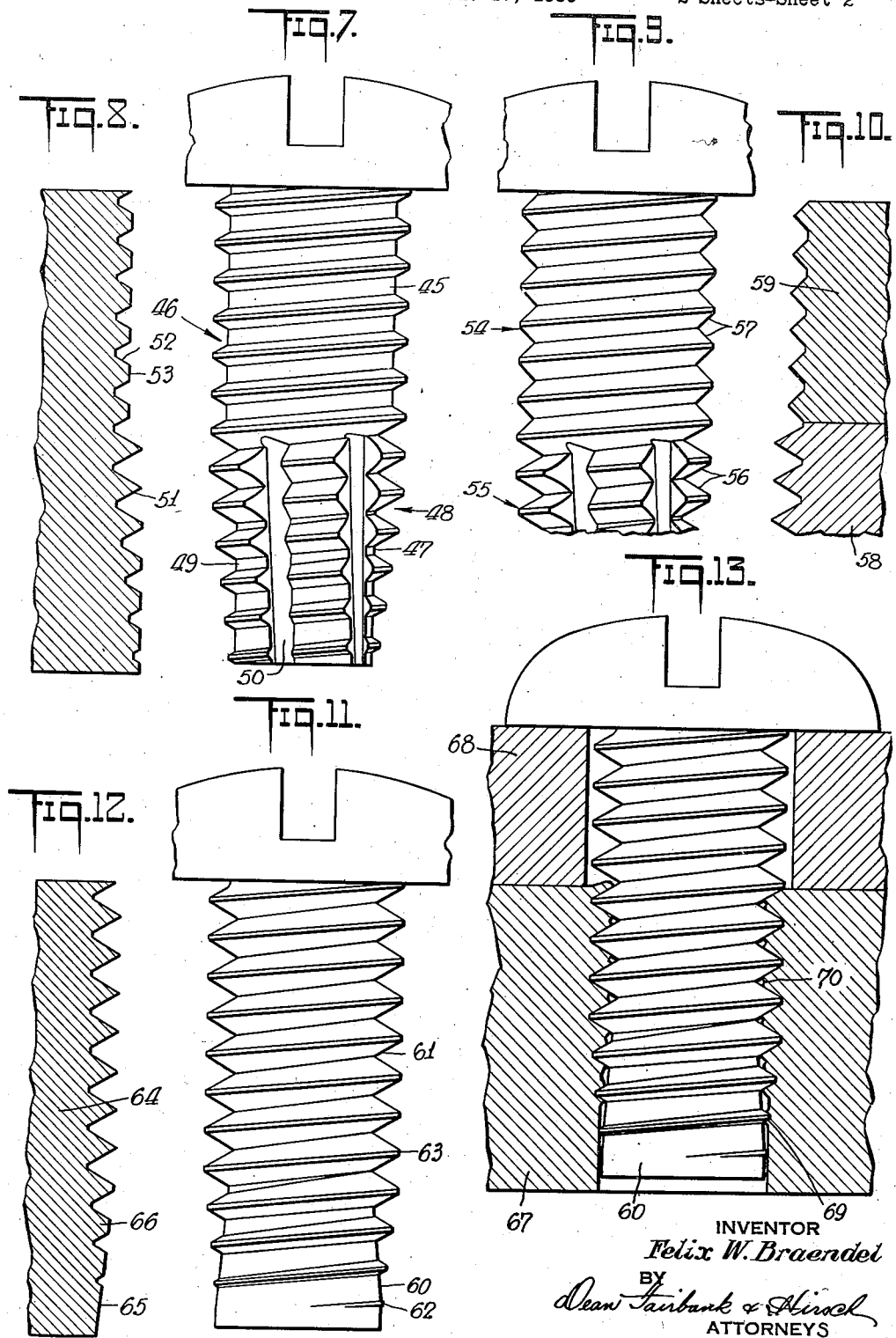

Patented Aug. 25, 1942

2,293,930

UNITED STATES PATENT OFFICE 2,293,930

SCREW

Felix W. Braendel, Union City, N. J., assignor to Groov-Pin Corporation, Union City, N. J., a corporation of New Jersey Application June 17, 1939, Serial No. 279,599

4 Claims. (Cl. 85—47)

It is an object of the present invention to provide a screw which will in the course of application not only form or cut its own thread into a metal bore, but will also deform the cut or formed thread to afford a secure lock of the screw shank in such bore.

Another object is to provide a screw of the above type which may be fabricated by a single thread rolling operation to provide thereon the conformations that bring the desired thread forming and locking operations to pass.

According to the invention, the threads on the shank of the screw act to deform the threads which the pilot end of the screw, depending upon its construction may either cut or press into the wall of the bore in the metal block into which the screw is introduced.

In one thread cutting embodiment of screw, a cutting groove is provided across the threads of the pilot with a profile different from that on the shank, the latter presenting a considerably larger cross-sectional area, illustratively either a larger root diameter or a wider profile angle of thread.

In another embodiment, the generally longitudinal thread cutting grooves at the pilot end afford an acute leading, cutting angle and an obtuse trailing angle at the corresponding thread segments and the contiguous portion of the screw shank of somewhat larger thread diameter has a similar groove arrangement with the angles at the leading and trailing edges transposed, so that said latter shank portion will serve to lock the screw in position and will gouge or shave its way out when the screw is turned in reverse direction for withdrawal.

In another embodiment in which the thread is produced by deformation rather than by cutting, the pilot end of the screw flares or slopes outward to present a root diameter larger than that of the shank of the screw, the threads having an outer diameter on said flaring pilot which, however, is smaller than that on the shank. In operation, accordingly, the track pressed into the wall of the bore by the narrow threads on the flaring pilot is deformed as the screw is brought home, to flow inward to near the root diameter of the shank threads so as effectively to block the withdrawal of the flaring pilot end of the screw from the bore.

In the accompanying drawings in which are shown one or more of various possible embodiments of the several features of the invention:

Fig. 1 is a side view of one embodiment of screw,

Fig. 2 is a transverse sectional view taken on line 2—2 of Fig. 1,

Fig. 3 is a transverse sectional view taken on line 3—3 of Fig. 2,

Fig. 4 is a view in longitudinal cross-section of a die plate used for rolling the screw of Fig. 1, Fig. 5 is a sectional view on line 5—5 of Fig. 4, Fig. 6 is a view similar to Fig. 5 on line 6—6 of Fig. 4, Fig. 7 is a view similar to Fig. 1 of another embodiment of screw, Fig. 8 is a view in transverse cross-section of a die used in rolling the screw of Fig. 7, Fig. 9 is a view similar to Fig. 1 of another embodiment of screw, Fig. 10 is a view similar to Fig. 8 of the die used in rolling the embodiment of Fig. 9, Fig. 11 is a view similar to Fig. 1 of a further embodiment of screw, Fig. 12 is a view similar to Fig. 8 of a die used in rolling the latter, and, Fig. 13 is a view in longitudinal cross-section showing the relation of the parts when the screw of Fig. 11 is installed.

Referring now to the embodiment of Figs. 1 to 3, the screw presents a shank 20 having a head 21 which may have a fillister slot 22 and a pilot 23 at its opposite end. The screw has a cutting pilot section 24, a locking section 25 and a shank section 26, all desirably with a root diameter uniform from end to end. The thread diameter is uniform along the shank section 26, uniform but somewhat less in diameter along locking section 25 and is progressively reduced along cutting section 24 to a minimum at the lower end of the latter. In the cutting section, the thread convolutions of progressively reduced diameter are spaced by flat root sections 27 of progressively greater width toward the end of the screw.

The threads of the cutting and locking sections are interrupted as shown in the drawings by a series of generally longitudinal, though preferably slightly inclined grooves 28, illustratively five in number, though, depending on conditions, a greater or lesser number may be used. Along the cutting section 24, these grooves as best shown in Fig. 2, impart to the screw the general cross-section of a cutting hob, each groove presenting an acute leading or cutting edge 29 on the corresponding segment 30 of each thread that it traverses and presenting an obtuse trailing edge 31. The grooves 28 of the cutting section are continued as shown in the drawings, along the length of the locking section 25, but along the latter section, the edges of said grooves are reversed in position with respect to those on the cutting section. That is, as best shown in Fig. 3, the obtuse angle 29' at one edge of the groove leads and the acute angle 31' at the opposite edge trails.

The diameter of the cross-section shown in Fig. 3 being slightly larger than that shown in Fig. 2, it will be seen that as the screw is threaded home, the periphery of thread segment 30, without itself doing any further thread cutting along the section shown in Fig. 3, will compress and slightly deform the wall of the thread cut into the bore by the cutting section 24. Thus, the threaded surface of said screw at the region along the locking section 25 deforms and thus very snugly engages the bore cut by the cutting section 24 and, therefore, results in a blocking deformation which effectively locks the screw in place. In withdrawal of the screw, the locking section shown in Fig. 3 will turn in clockwise direction and the originally trailing acute edge 31' of each of the teeth determined by groove 28 now becomes the leading edge and cuts or shaves such deformed obstruction out of its path as the screw is being withdrawn.

It is preferred to fabricate the screw by a single rolling operation utilizing in combination with an ordinary die (not shown) the composite die shown in Figs. 4 and 5 and 6. That die has the oblique ribs 35 on its rolling face which form the threads, and has a two-piece insert with more nearly vertical grooves by which the longitudinal grooves of the cutting and locking section respectively are formed. The insert piece 36 which rolls the cutting section 24 has its ribs 37 directed with their slopes toward the right as shown in Fig. 5 and the insert piece 38 which rolls the locking section has its ribs 39 aligned with those of insert piece 36, but in reverse direction as shown in Fig. 6, with the sloping side of each of the ribs at the left.

Preferably the section 40 at the right end of the die has a minimum length of approximately three times the pitch circumference of the screw to be rolled. The insert sections 36 and 38 are of length not less than twice the pitch circumference of the screw to be rolled, while the section 41 at the left end of the die should be of length not less than one pitch circle of such screw. Thus, in operation, an uninterrupted thread is effectively rolled by the section 40. As the insert sections 36 and 38 come into action, the rolled threads become transversely interrupted by the steep grooves 37 and 39 while the threads near the upper or head section of the screw are continued to be engaged by the section 42 of the thread rolling plate. After the insert sections 36 and 38 have been passed, section 41 comes into action for thread cleaning that is for cleaning up any unevenness or burrs produced by sections 36 and 38. The die may be formed according to the general teachings of the copending application of Cecil C. Richards, Serial No. 271,472, filed May 3, 1939.

It is understood that while the inserts 36 and 38 are desirably used in the precise relation shown, they could if desired by disposed at other portions of the length of the die plate, and need not necessarily be aligned as indicated.

In the embodiment of Fig. 7, the root diameter 45 of the shank 46 is considerably larger than the root diameter 47 of the pilot 48. The thread on the pilot is progressively reduced in diameter as shown, toward its forward end, with the thread convolutions spaced by flat root sections 49 of progressively greater width substantially as in Fig. 1. Transverse cutting grooves 50 similar to those shown at the cutting section of Fig. 1 extend without modification throughout the height of the pilot 48.

The screw as set forth is readily made by means of the threading die plate shown in Fig. 8 in which the bases of the ribs 51 at the pilot forming end are progressively nearer the rolling face to determine the profile of thread thereof, while the ribs 52 on the shank beyond the pilot are ground off as shown to form the flats 53. The threading die of Fig. 8 may be made according to the teachings of the Richards application above identified.

In use, it will be seen that the pilot end 48 of screw in Fig. 7 will cut its way into the metal bore into which it is screwed, whereupon the shank end 46 of the screw will flatten out or compress the relatively sharp thread cut by said pilot end and thereby lock the screw in place.

Claims specific to the embodiment of Figs. 7 and 8 just described constitute the subject-matter of my divisional application, Serial No. 434,505, filed March 13, 1942.

The embodiment of Fig. 9 is related to that of Fig. 7 with the difference that the thread along the shank 54 of the screw differs from that along the cutting pilot 55, not by change in pitch diameter but in profile angle. As specifically illustrated, the profile angle 56 at the pilot may be 60 degrees and the profile angle 57 at the shank 90 degrees. As a consequence, after the thread has been cut by the pilot 55, the shank is threaded home by a combination of wedging and compression of the cut thread, with consequent locking effectiveness.

As best shown in Fig. 10, the rolling die for fabricating the screw of Fig. 9 may be made in two sections 58 and 59, the former being complementary to the cutting edge 56 of lower angularity at the pilot section, and the latter being complementary to the locking thread 57 of higher angularity at the shank section.

Referring now to the embodiment of Figs 11, 12 and 13, the screw here shown has a pilot end 60 with a root diameter flaring outwardly or becoming progressively larger toward its extremity. The pitch diameter 61 of the shank is uniform and equal to the root diameter at the pilot end of the screw. The outer diameter of the thread however, is a minimum at 62 at the lower end of the enlarged pilot where it comes flush with said pilot and it becomes progressively larger to a maximum 63 along the length of the shank. The blank used for rolling the screw of Fig. 11 is uniform in diameter from the end to the head.

As best shown in Fig. 12, this screw may be rolled by a pair of dies, one of which is shown at 64 in which the pilot forming end is ground at the negative angle 65 shown, the roots of the thread-forming ribs 66 along the pilot forming end of the die being progressively nearer the rolling face. This die also may be made according to the teachings of the copending Richards application above identified.

The use of the screw will be apparent from Fig. 13 in which the screw is shown as embedded in a block 67 and serving to secure thereto a plate 68. The stock is bored with a drill size preferably equal to that of the enlarged pilot 60 which latter has a slight minus tolerance. It is clear that the entering end of the screw will serve to deform the metal stock to generate a screw track 69 therein, which becomes progressively wider and larger as the screw is threaded home. In this operation, the material at the wall of the bore is caused progressively to flow inward between successive threads as shown at 70 in Fig. 13. The stock that has flown into the threads of the screw shank at 70 presents an inner diameter considerably smaller than that of the flaring shank 60 and positively blocks the withdrawal thereof. The invention is applicable not only in the relation particularly shown in the drawings, but also for the connection of sheets of metal.

As many changes could be made in the above constructions and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A screw of the self-cutting, self-locking type comprising a threaded shank and a threaded pilot, the latter being longitudinally grooved to present thread cutting edges, the profile angle of the cutting thread portion being substantially more acute than that of the shank, whereby the latter will, as it is screwed home, cause locking deformation of the thread cut by the former.

2. The combination recited in claim 1 in which the root diameter of the pilot is no greater than that of the shank and the profile angle of the pilot thread is approximately 60 degrees and that of the shank thread is approximately 90 degrees.

3. A self-cutting screw comprising a threaded shank reduced in diameter at its lower end, a threaded cutting conformation at said lower end with advance cutting edges operative in the introduction of the screw into a bore, and a second threaded cutting conformation adjacent thereto with its cutting edge trailing in the introduction of the screw and operative in the reverse rotation of the screw for removal.

4. A self-cutting screw comprising a threaded shank and a threaded pilot, the thread of the latter being of progressively larger diameter toward the shank, said thread having longitudinal grooves presenting leading acute cutting edges and trailing obtuse non-cutting edges at the lower part of the pilot, the rest of the pilot being of somewhat larger thread diameter and having longitudinal grooves presenting leading obtuse non-cutting edges and trailing acute edges, whereby said trailing acute edges in the application of the screw, will deform the thread cut by the said leading acute edges, and in turning the screw in reverse direction for withdrawal, the originally trailing acute edges will lead and will shave their way out for such withdrawal.

FELIX W. BRAENDEL.